(12) United States Patent
Zhou et al.

(10) Patent No.: US 11,924,837 B2
(45) Date of Patent: Mar. 5, 2024

(54) TECHNIQUES FOR PHYSICAL UPLINK CONTROL CHANNEL BEAM FAILURE RECOVERY RESELECTION

(71) Applicant: QUALCOMM Incorporated, San Diego, CA (US)

(72) Inventors: Yan Zhou, San Diego, CA (US); Jung Ho Ryu, Fort Lee, NJ (US); Tao Luo, San Diego, CA (US); Tianyang Bai, Somerville, NJ (US); Junyi Li, Chester, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/949,486

(22) Filed: Oct. 30, 2020

(65) Prior Publication Data

US 2021/0153187 A1    May 20, 2021

Related U.S. Application Data

(60) Provisional application No. 62/936,153, filed on Nov. 15, 2019.

(51) Int. Cl.
*H04W 72/21*    (2023.01)
*H04W 72/1268*    (2023.01)
(Continued)

(52) U.S. Cl.
CPC ....... *H04W 72/21* (2023.01); *H04W 72/1268* (2013.01); *H04W 72/23* (2023.01); *H04W 72/56* (2023.01); *H04W 76/19* (2018.02)

(58) Field of Classification Search
CPC . H04B 7/0695; H04B 7/088; H04W 72/0413; H04W 72/10; H04W 72/1268;
(Continued)

(56) References Cited

U.S. PATENT DOCUMENTS

2018/0302889 A1* 10/2018 Guo ............... H04B 7/0695
2018/0323856 A1* 11/2018 Xiong ............. H04B 7/088
(Continued)

FOREIGN PATENT DOCUMENTS

WO    WO-2020263050 A1 * 12/2020

OTHER PUBLICATIONS

A new PUCCH resource mapping method in interband TDD carrier aggregation systems, Lu et al., IEEE Xplore (Year: 2013).*
(Continued)

*Primary Examiner* — Un C Cho
*Assistant Examiner* — Lalita W Pace
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may select a first resource, of a plurality of resources, for transmission of a request to initiate a beam failure recovery procedure. The UE may determine that another transmission is scheduled contemporaneously with the transmission of the request to initiate the beam failure recovery procedure using the first resource and is to be transmitted using the first resource. The UE may select a second resource for transmission of the request to initiate the beam failure recovery procedure based at least in part on the determination that the other transmission is scheduled contemporaneously with the transmission of the request to initiate the beam failure recovery procedure and is to be transmitted using the first resource. Numerous other aspects are provided.

30 Claims, 5 Drawing Sheets

(51) Int. Cl.
*H04W 72/23* (2023.01)
*H04W 72/56* (2023.01)
*H04W 76/19* (2018.01)

(58) Field of Classification Search
CPC ..... H04W 72/14; H04W 72/02; H04W 76/19; H04W 72/21; H04W 72/23; H04W 72/56
See application file for complete search history.

(56) References Cited

U.S. PATENT DOCUMENTS

| | | | |
|---|---|---|---|
| 2019/0052339 A1* | 2/2019 | Zhou | H04W 52/40 |
| 2019/0261281 A1* | 8/2019 | Jung | H04W 72/0473 |
| 2019/0274098 A1* | 9/2019 | Cheng | H04W 76/19 |
| 2019/0306765 A1* | 10/2019 | Cirik | H04L 5/0051 |
| 2019/0349061 A1* | 11/2019 | Cirik | H04L 1/1896 |
| 2019/0373598 A1* | 12/2019 | Kundu | H04B 7/0632 |
| 2020/0145280 A1* | 5/2020 | Cirik | H04W 72/14 |
| 2021/0013948 A1* | 1/2021 | Agiwal | H04L 47/14 |
| 2021/0028849 A1* | 1/2021 | Chin | H04B 7/06964 |
| 2021/0029724 A1* | 1/2021 | Tsai | H04W 28/0278 |
| 2021/0036757 A1* | 2/2021 | Yu | H04L 1/1861 |
| 2021/0105100 A1* | 4/2021 | Zhou | H04L 1/1671 |
| 2021/0105126 A1* | 4/2021 | Yi | H04W 72/1242 |
| 2021/0274494 A1* | 9/2021 | Feng | H04L 1/1896 |
| 2021/0289536 A1* | 9/2021 | Liu | H04W 74/0841 |
| 2021/0314049 A1* | 10/2021 | Matsumura | H04W 24/10 |
| 2022/0006690 A1* | 1/2022 | Matsumura | H04W 72/0413 |
| 2022/0124784 A1* | 4/2022 | Kang | H04L 5/0094 |
| 2022/0158794 A1* | 5/2022 | Zhang | H04L 5/0055 |
| 2022/0191890 A1* | 6/2022 | Guo | H04L 5/0055 |
| 2022/0353891 A1* | 11/2022 | Kang | H04L 1/1861 |

OTHER PUBLICATIONS

Intel Corporation: "Discussion on Multi-Beam Enhancements", 3GPP TSG RAN WG1 Meeting #99, 3GPP Draft; R1-1912223, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 18, 2019-Nov. 22, 2019, Nov. 9, 2019 (Nov. 9, 2019), 11 Pages, XP051823300, Retrieved from the Internet: URL: https://ftp.3gpp.org/tsg_ran/WG1_ RL1/ TSGR1_99/Docs/R1-1912223.zip [retrieved on Nov. 9, 2019] paragraph [3.BeamrecoveryonSCell].
International Search Report and Written Opinion—PCT/US2020/070736—ISA/EPO—dated Feb. 15, 2021.

\* cited by examiner

TECHNIQUES FOR PHYSICAL UPLINK CONTROL CHANNEL BEAM FAILURE RECOVERY RESELECTION

CROSS-REFERENCE TO RELATED APPLICATION

This Patent Application claims priority to U.S. Provisional Patent Application No. 62/936,153, filed on Nov. 15, 2019, entitled "TECHNIQUES FOR PHYSICAL UPLINK CONTROL CHANNEL BEAM FAILURE RECOVERY RESELECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical uplink control channel beam failure recovery reselection.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes selecting a first resource, of a plurality of resources, for transmission of a request to initiate a beam failure recovery procedure; determining that another transmission is scheduled contemporaneously with the transmission of the request to initiate the beam failure recovery procedure using the first resource and is to be transmitted using the first resource; and selecting a second resource for transmission of the request to initiate the beam failure recovery procedure based at least in part on the determination that the other transmission is scheduled contemporaneously with the transmission of the request to initiate the beam failure recovery procedure and is to be transmitted using the first resource.

In some aspects, the method includes transmitting the request to initiate the beam failure recovery procedure using the second resource.

In some aspects, the method includes detecting a beam failure; and wherein selecting the first resource includes selecting the first resource based at least in part on the detection of the beam failure, selecting the first resource includes selecting the first resource based at least in part on the detection of the beam failure.

In some aspects, the first resource is at least one of a physical uplink control channel beam failure recovery request resource or a scheduling request resource.

In some aspects, the second resource is at least one of physical uplink control channel beam failure recovery request resource or a scheduling request resource.

In some aspects, determining that another transmission is scheduled contemporaneously with the transmission of the request to initiate the beam failure recovery procedure using the first resource and is to be transmitted using the first resource includes determining that a hybrid automatic repeat request acknowledgement message with a physical uplink control channel format 1 is to be prioritized for the first resource over the transmission of the request to initiate the beam failure recovery procedure over the first resource, wherein the first resource is a scheduling request with a physical uplink control channel format 0.

In some aspects, determining that another transmission is scheduled contemporaneously with the transmission of the request to initiate the beam failure recovery procedure using the first resource and is to be transmitted using the first resource includes determining that a first uplink transmission is to be prioritized for the first resource over the transmission of the request to initiate the beam failure recovery procedure, wherein the first resource is a second uplink transmission with a lower transmission priority than the first uplink transmission.

In some aspects, selecting the first resource includes selecting a first physical uplink control channel beam failure recovery resource based at least in part on a network characteristic; and wherein selecting the second resource includes selecting to a second physical uplink control channel beam failure recovery resource based at least in part on the determination to drop the first physical uplink control channel beam failure recovery resource.

In some aspects, the method includes determining to drop the second physical uplink control channel beam failure recovery resource; selecting to a scheduling request resource based at least in part on the determination to drop the second physical uplink control channel beam failure recovery resource; and requesting an uplink grant using the scheduling request resource based at least in part on the reselection to the scheduling request resource.

In some aspects, selecting the first resource includes selecting a first physical uplink control channel beam failure recovery resource in a same physical uplink control channel group as a failed secondary cell associated with the beam failure recovery procedure; and wherein selecting the second resource includes selecting a second physical uplink control channel beam failure recovery resource.

In some aspects, the second physical uplink control channel beam failure recovery resource in the same physical uplink control channel group as the failed secondary cell.

In some aspects, the second physical uplink control channel beam failure recovery resource is in a different physical uplink control channel group than the physical uplink control channel group of the failed secondary cell.

In some aspects, the method includes determining to drop the second physical uplink control channel beam failure recovery resource; selecting to a scheduling request resource based at least in part on the determination to drop the second physical uplink control channel beam failure recovery resource; and requesting an uplink grant using the scheduling request resource based at least in part on the reselection to the scheduling request resource.

In some aspects, the scheduling request resource is at least one of: a scheduling request resource that is available to the UE, a scheduling request resource that is available to the UE in the same physical uplink control channel group as the failed secondary cell, or a scheduling request resource that occurs sequentially first in time.

In some aspects, selecting the first resource includes selecting a physical uplink control channel beam failure recovery resource; and wherein selecting the second resource includes selecting a scheduling request resource to request an uplink grant.

In some aspects, a UE for wireless communication includes a memory; and one or more processors operatively coupled to the memory, the memory and the one or more processors configured to: select a first resource, of a plurality of resources, for transmission of a request to initiate a beam failure recovery procedure; determine that another transmission is scheduled contemporaneously with the transmission of the request to initiate the beam failure recovery procedure using the first resource and is to be transmitted using the first resource; and select a second resource for transmission of the request to initiate the beam failure recovery procedure based at least in part on the determination that the other transmission is scheduled contemporaneously with the transmission of the request to initiate the beam failure recovery procedure and is to be transmitted using the first resource.

In some aspects, the one or more processors are further configured to: transmit the request to initiate the beam failure recovery procedure using the second resource.

In some aspects, the one or more processors are further configured to: detect a beam failure; and wherein the one or more processors, when selecting the first resource, are configured to: select the first resource based at least in part on the detection of the beam failure.

In some aspects, the first resource is at least one of a physical uplink control channel beam failure recovery request resource or a scheduling request resource.

In some aspects, the second resource is at least one of physical uplink control channel beam failure recovery request resource or a scheduling request resource.

In some aspects, the one or more processors, when determining that another transmission is scheduled contemporaneously with the transmission of the request to initiate the beam failure recovery procedure using the first resource and is to be transmitted using the first resource, are configured to: determine that a hybrid automatic repeat request acknowledgement message with a physical uplink control channel format 1 is to be prioritized for the first resource over the transmission of the request to initiate the beam failure recovery procedure over the first resource, wherein the first resource is a scheduling request with a physical uplink control channel format 0.

In some aspects, the one or more processors, when determining that another transmission is scheduled contemporaneously with the transmission of the request to initiate the beam failure recovery procedure using the first resource and is to be transmitted using the first resource, are configured to: determine that a first uplink transmission is to be prioritized for the first resource over the transmission of the request to initiate the beam failure recovery procedure, wherein the first resource is a second uplink transmission with a lower transmission priority than the first uplink transmission.

In some aspects, the one or more processors, when selecting the first resource, are configured to: select a first physical uplink control channel beam failure recovery resource based at least in part on a network characteristic; and wherein the one or more processors, when selecting the second resource, are configured to: select to a second physical uplink control channel beam failure recovery resource based at least in part on the determination to drop the first physical uplink control channel beam failure recovery resource.

In some aspects, the one or more processors are further configured to: determine to drop the second physical uplink control channel beam failure recovery resource; select to a scheduling request resource based at least in part on the determination to drop the second physical uplink control channel beam failure recovery resource; and request an uplink grant using the scheduling request resource based at least in part on the reselection to the scheduling request resource.

In some aspects, the one or more processors, when selecting the first resource, are configured to: select a first physical uplink control channel beam failure recovery resource in a same physical uplink control channel group as a failed secondary cell associated with the beam failure recovery procedure; and wherein the one or more processors, when selecting the second resource, are configured to: select a second physical uplink control channel beam failure recovery resource.

In some aspects, the second physical uplink control channel beam failure recovery resource in the same physical uplink control channel group as the failed secondary cell.

In some aspects, the second physical uplink control channel beam failure recovery resource is in a different physical uplink control channel group than the physical uplink control channel group of the failed secondary cell.

In some aspects, the one or more processors are further configured to: determine to drop the second physical uplink control channel beam failure recovery resource; select to a scheduling request resource based at least in part on the determination to drop the second physical uplink control channel beam failure recovery resource; and request an uplink grant using the scheduling request resource based at least in part on the reselection to the scheduling request resource.

In some aspects, the scheduling request resource is at least one of: a scheduling request resource that is available to the UE, a scheduling request resource that is available to the UE in the same physical uplink control channel group as the failed secondary cell, or a scheduling request resource that occurs sequentially first in time.

In some aspects, the one or more processors, when selecting the first resource, are configured to: select a physical uplink control channel beam failure recovery resource; and wherein the one or more processors, when selecting the second resource, are configured to: select a scheduling request resource to request an uplink grant.

In some aspects, a non-transitory computer-readable medium storing a set of instructions for wireless communication includes one or more instructions that, when executed by one or more processors of a UE, cause the UE to: select a first resource, of a plurality of resources, for transmission of a request to initiate a beam failure recovery procedure; determine that another transmission is scheduled contemporaneously with the transmission of the request to initiate the beam failure recovery procedure using the first resource and is to be transmitted using the first resource; and select a second resource for transmission of the request to initiate the beam failure recovery procedure based at least in part on the determination that the other transmission is scheduled contemporaneously with the transmission of the request to initiate the beam failure recovery procedure and is to be transmitted using the first resource.

In some aspects, the one or more instructions further cause the UE to: transmit the request to initiate the beam failure recovery procedure using the second resource.

In some aspects, the one or more instructions further cause the UE to: detect a beam failure; and wherein the one or more instructions, that cause the UE to select the first resource, cause the UE to: select the first resource based at least in part on the detection of the beam failure.

In some aspects, the first resource is at least one of a physical uplink control channel beam failure recovery request resource or a scheduling request resource.

In some aspects, the second resource is at least one of physical uplink control channel beam failure recovery request resource or a scheduling request resource.

In some aspects, the one or more instructions, that cause the UE to determine that another transmission is scheduled contemporaneously with the transmission of the request to initiate the beam failure recovery procedure using the first resource and is to be transmitted using the first resource, cause the UE to: determine that a hybrid automatic repeat request acknowledgement message with a physical uplink control channel format 1 is to be prioritized for the first resource over the transmission of the request to initiate the beam failure recovery procedure over the first resource, wherein the first resource is a scheduling request with a physical uplink control channel format 0.

In some aspects, the one or more instructions, that cause the UE to determine that another transmission is scheduled contemporaneously with the transmission of the request to initiate the beam failure recovery procedure using the first resource and is to be transmitted using the first resource, cause the UE to: determine that a first uplink transmission is to be prioritized for the first resource over the transmission of the request to initiate the beam failure recovery procedure, wherein the first resource is a second uplink transmission with a lower transmission priority than the first uplink transmission.

In some aspects, the one or more instructions, that cause the UE to select the first resource, cause the UE to: select a first physical uplink control channel beam failure recovery resource based at least in part on a network characteristic; and wherein the one or more instructions, that cause the UE to select the second resource, cause the UE to: select to a second physical uplink control channel beam failure recovery resource based at least in part on the determination to drop the first physical uplink control channel beam failure recovery resource.

In some aspects, the one or more instructions further cause the UE to: determine to drop the second physical uplink control channel beam failure recovery resource; select to a scheduling request resource based at least in part on the determination to drop the second physical uplink control channel beam failure recovery resource; and request an uplink grant using the scheduling request resource based at least in part on the reselection to the scheduling request resource.

In some aspects, the one or more instructions, that cause the UE to select the first resource, cause the UE to: select a first physical uplink control channel beam failure recovery resource in a same physical uplink control channel group as a failed secondary cell associated with the beam failure recovery procedure; and wherein the one or more instructions, that cause the UE to select the second resource, cause the UE to: select a second physical uplink control channel beam failure recovery resource.

In some aspects, the second physical uplink control channel beam failure recovery resource in the same physical uplink control channel group as the failed secondary cell.

In some aspects, the second physical uplink control channel beam failure recovery resource is in a different physical uplink control channel group than the physical uplink control channel group of the failed secondary cell.

In some aspects, the one or more instructions further cause the UE to: determine to drop the second physical uplink control channel beam failure recovery resource; select to a scheduling request resource based at least in part on the determination to drop the second physical uplink control channel beam failure recovery resource; and request an uplink grant using the scheduling request resource based at least in part on the reselection to the scheduling request resource.

In some aspects, the scheduling request resource is at least one of: a scheduling request resource that is available to the UE, a scheduling request resource that is available to the UE in the same physical uplink control channel group as the failed secondary cell, or a scheduling request resource that occurs sequentially first in time.

In some aspects, the one or more instructions, that cause the UE to select the first resource, cause the UE to: select a physical uplink control channel beam failure recovery resource; and wherein the one or more instructions, that cause the UE to select the second resource, cause the UE to: select a scheduling request resource to request an uplink grant.

In some aspects, an apparatus for wireless communication includes means for selecting a first resource, of a plurality of resources, for transmission of a request to initiate a beam failure recovery procedure; means for determining that another transmission is scheduled contemporaneously with the transmission of the request to initiate the beam failure recovery procedure using the first resource and is to be transmitted using the first resource; and means for selecting a second resource for transmission of the request to initiate the beam failure recovery procedure based at least in part on the determination that the other transmission is scheduled contemporaneously with the transmission of the request to initiate the beam failure recovery procedure and is to be transmitted using the first resource.

In some aspects, the apparatus includes means for transmitting the request to initiate the beam failure recovery procedure using the second resource.

In some aspects, the apparatus includes means for detecting a beam failure; and wherein the means for selecting the first resource includes means for selecting the first resource based at least in part on the detection of the beam failure. the means for selecting the first resource includes means for selecting the first resource based at least in part on the detection of the beam failure.

In some aspects, the first resource is at least one of a physical uplink control channel beam failure recovery request resource or a scheduling request resource.

In some aspects, the second resource is at least one of physical uplink control channel beam failure recovery request resource or a scheduling request resource.

In some aspects, the means for determining that another transmission is scheduled contemporaneously with the transmission of the request to initiate the beam failure recovery procedure using the first resource and is to be transmitted using the first resource includes means for determining that a hybrid automatic repeat request acknowledgement message with a physical uplink control channel format 1 is to be prioritized for the first resource over the transmission of the request to initiate the beam failure recovery procedure over the first resource, wherein the first resource is a scheduling request with a physical uplink control channel format 0.

In some aspects, the means for determining that another transmission is scheduled contemporaneously with the transmission of the request to initiate the beam failure recovery procedure using the first resource and is to be transmitted using the first resource includes means for determining that a first uplink transmission is to be prioritized for the first resource over the transmission of the request to initiate the beam failure recovery procedure, wherein the first resource is a second uplink transmission with a lower transmission priority than the first uplink transmission.

In some aspects, the means for selecting the first resource includes means for selecting a first physical uplink control channel beam failure recovery resource based at least in part on a network characteristic; and wherein the means for selecting the second resource includes means for selecting to a second physical uplink control channel beam failure recovery resource based at least in part on the determination to drop the first physical uplink control channel beam failure recovery resource.

In some aspects, the apparatus includes means for determining to drop the second physical uplink control channel beam failure recovery resource; means for selecting to a scheduling request resource based at least in part on the determination to drop the second physical uplink control channel beam failure recovery resource; and means for requesting an uplink grant using the scheduling request resource based at least in part on the reselection to the scheduling request resource.

In some aspects, the means for selecting the first resource includes means for selecting a first physical uplink control channel beam failure recovery resource in a same physical uplink control channel group as a failed secondary cell associated with the beam failure recovery procedure; and wherein the means for selecting the second resource includes means for selecting a second physical uplink control channel beam failure recovery resource.

In some aspects, the second physical uplink control channel beam failure recovery resource in the same physical uplink control channel group as the failed secondary cell.

In some aspects, the second physical uplink control channel beam failure recovery resource is in a different physical uplink control channel group than the physical uplink control channel group of the failed secondary cell.

In some aspects, the apparatus includes means for determining to drop the second physical uplink control channel beam failure recovery resource; means for selecting to a scheduling request resource based at least in part on the determination to drop the second physical uplink control channel beam failure recovery resource; and means for requesting an uplink grant using the scheduling request resource based at least in part on the reselection to the scheduling request resource.

In some aspects, the scheduling request resource is at least one of: a scheduling request resource that is available to the apparatus, a scheduling request resource that is available to the apparatus in the same physical uplink control channel group as the failed secondary cell, or a scheduling request resource that occurs sequentially first in time.

In some aspects, the means for selecting the first resource includes means for selecting a physical uplink control channel beam failure recovery resource; and wherein the means for selecting the second resource includes means for selecting a scheduling request resource to request an uplink grant.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
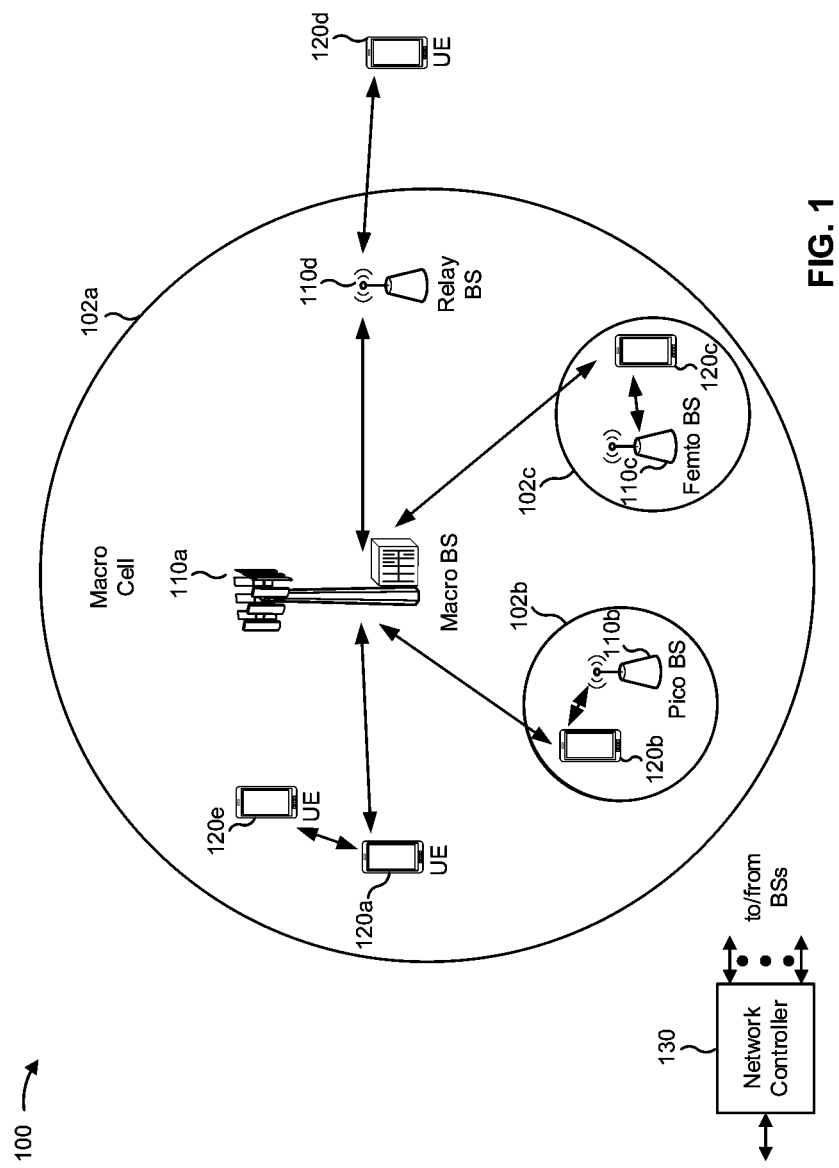
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
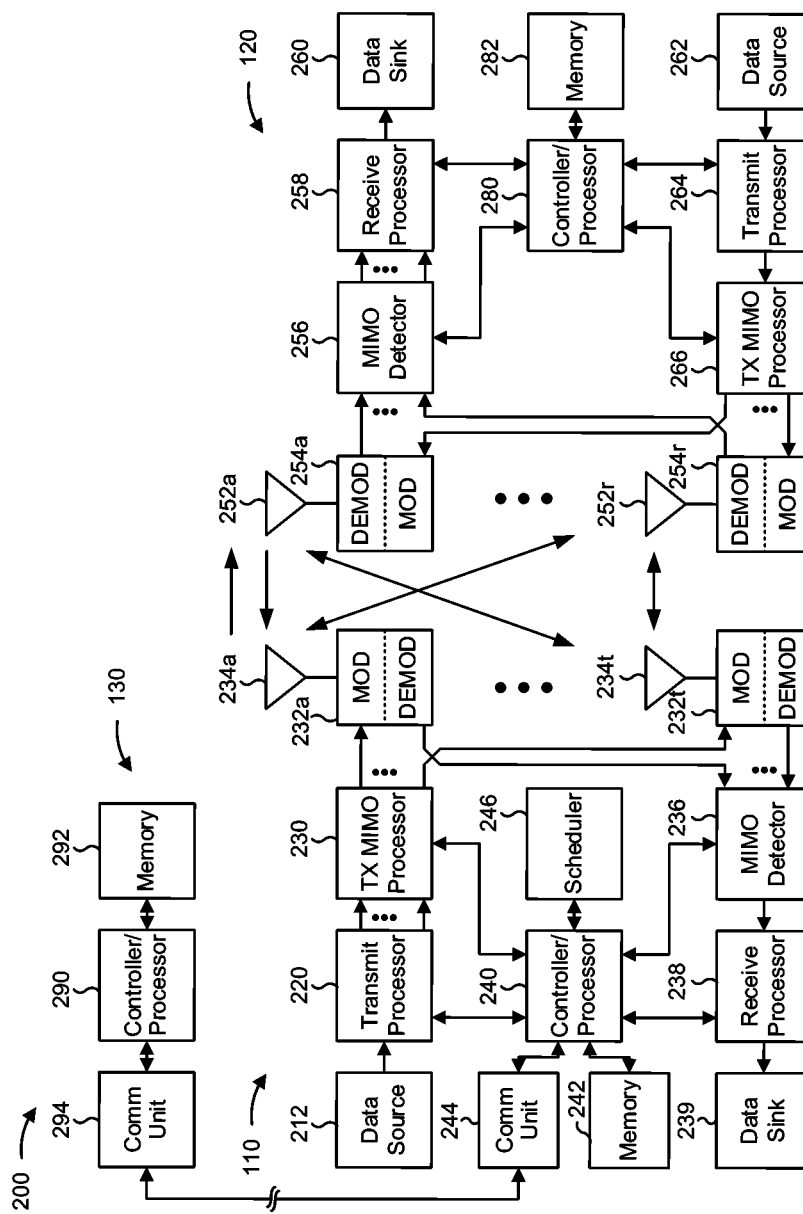
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with physical uplink control channel beam failure recovery resource reselection, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for selecting a first resource, of a plurality of resources, for transmission of a request to initiate a beam failure recovery procedure, means for determining, based on a defined rule, to drop the transmission of the request to initiate the beam failure recovery procedure using the first resource, means for reselecting a second resource, of the plurality of resources, for transmission of the request to initiate the beam failure recovery procedure based at least in part on the determination to drop the transmission of the request to initiate the beam failure recovery procedure using the first resource, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, a UE may detect a beam failure event and initiate a beam failure recovery procedure. For example, the UE may determine that a network characteristic satisfies a threshold (e.g., a beam with less than a threshold signal strength, reference signal received power (RSRP), reference signal received quality (RSRQ), and/or the like) and may transmit a request to initiate a beam failure recovery procedure. The UE may select, from a group of physical uplink control channel (PUCCH) beam failure recovery (BFR) resources, a resource on which to transmit the request to initiate the beam failure recovery procedure. However, in some cases, transmission of the request to initiate the beam failure recovery procedure on the selected resource may collide with another transmission on the selected resource.

Some aspects described herein enable reselection to another resource to enable initiation of a beam failure recovery procedure. For example, based at least in part on determining to drop transmission of the request to initiate the beam failure recovery procedure on the selected resource, the UE may reselect to another PUCCH BFR resource or scheduling request (SR) resource. In this way, the UE may successfully initiate a beam failure recovery procedure even when an initially selected resource collides with another transmission.

Figure 3:
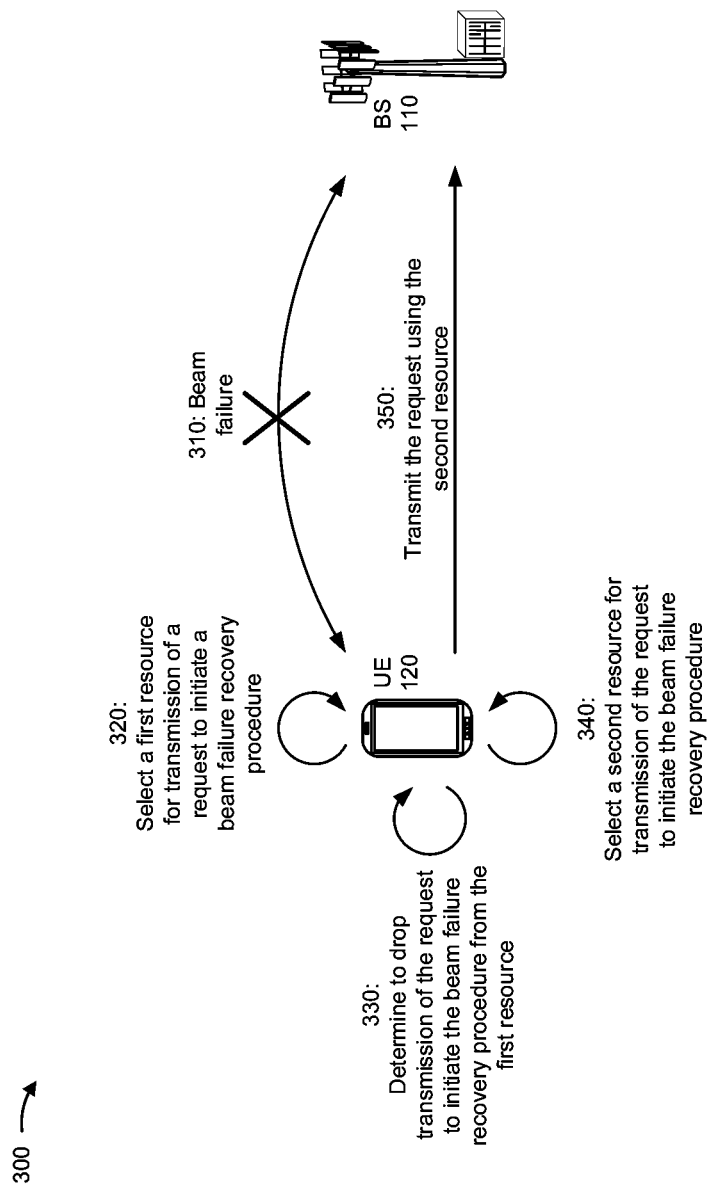
FIG. 3 is a diagram illustrating an example of physical uplink control channel beam failure recovery resource reselection, in accordance with various aspects of the present disclosure.

FIG. 3 is a diagram illustrating an example 300 of physical uplink control channel beam failure recovery resource reselection, in accordance with various aspects of the present disclosure. As shown in FIG. 3, example 300 includes a UE 120 and a BS 110.

As further shown in FIG. 3, and by reference number 310, UE 120 may detect an event associated with triggering a beam failure recovery procedure. For example, UE 120 may detect a beam failure on a beam (e.g., of a secondary cell) used for communication with BS 110. In some aspects, UE 120 may detect the beam failure based at least in part on determining that a measurement of a beam is less than a threshold.

As further shown in FIG. 3, and by reference number 320, UE 120 may select a first resource for transmission of a request to initiate a beam failure recovery procedure. For example, UE 120 may select a first PUCCH BFR resource. Additionally, or alternatively, UE 120 may select a first SR resource for a PUCCH BFR transmission. In some aspects, UE 120 may select the first resource based at least in part on a network characteristic. For example, UE 120 may select the first resource based at least in part on a PUCCH link quality metric. In some aspects, UE 120 may select the first resource from the same PUCCH group that includes a secondary cell on which the beam failure is detected. Additionally, or alternatively, UE 120 may select the first resource from a different PUCCH group than a PUCCH group that includes the secondary cell on which the beam failure is detected.

As further shown in FIG. 3, and by reference number 330, UE 120 may determine to drop transmission of the request to initiate a beam failure recovery procedure from the first resource. For example, UE 120 may determine to not transmit the request to initiate the beam failure recovery procedure on the first PUCCH BFR resource. In some aspects, UE 120 may determine to drop transmission of the request based at least in part on a rule. For example, when the first resource is an SR resource associated with PUCCH format 0 and collides with a HARQ-ACK associated with PUCCH format 1, UE 120 may determine to prioritize transmission of the HARQ-ACK on the first resource. Similarly, when the first resource is an SR with a lower transmission priority than another SR (with a higher transmission priority), UE 120 may prioritize the other SR with the higher transmission priority.

As further shown in FIG. 3, and by reference number 340, UE 120 may select a second resource for transmission of the request to initiate the beam failure recovery procedure. For example, UE 120 may reselect to a second PUCCH BFR resource. In some aspects, UE 120 may further reselect to another resource. For example, UE 120 may determine that transmission of the request to initiate the beam failure recovery procedure on the second PUCCH BFR resource is to be dropped (e.g., based at least in part on a rule, as described above), and may select an SR resource on which to request an uplink grant for transmission of a medium access control (MAC) control element (CE) (MAC CE). In some aspects, UE 120 may select any SR resource, an SR resource of the same PUCCH group that included the secondary cell on which the beam failure is detected, any regular SR, and/or the like. Additionally, or alternatively, UE 120 may select a resource that is sequentially first in time to which to reselect.

As further shown in FIG. 3, and by reference number 350, UE 120 may transmit the request using the second resource. For example, UE 120 may transmit the request to initiate the beam failure recovery procedure on the second PUCCH BFR resource. Additionally, or alternatively, as described above, UE 120 may further reselect to another resource and may transmit a request for an uplink grant on the other resource to enable UE 120 to initiate the beam failure recovery resource.

As indicated above, FIG. 3 is provided as an example. Other examples may differ from what is described with respect to FIG. 3.

Figure 4:
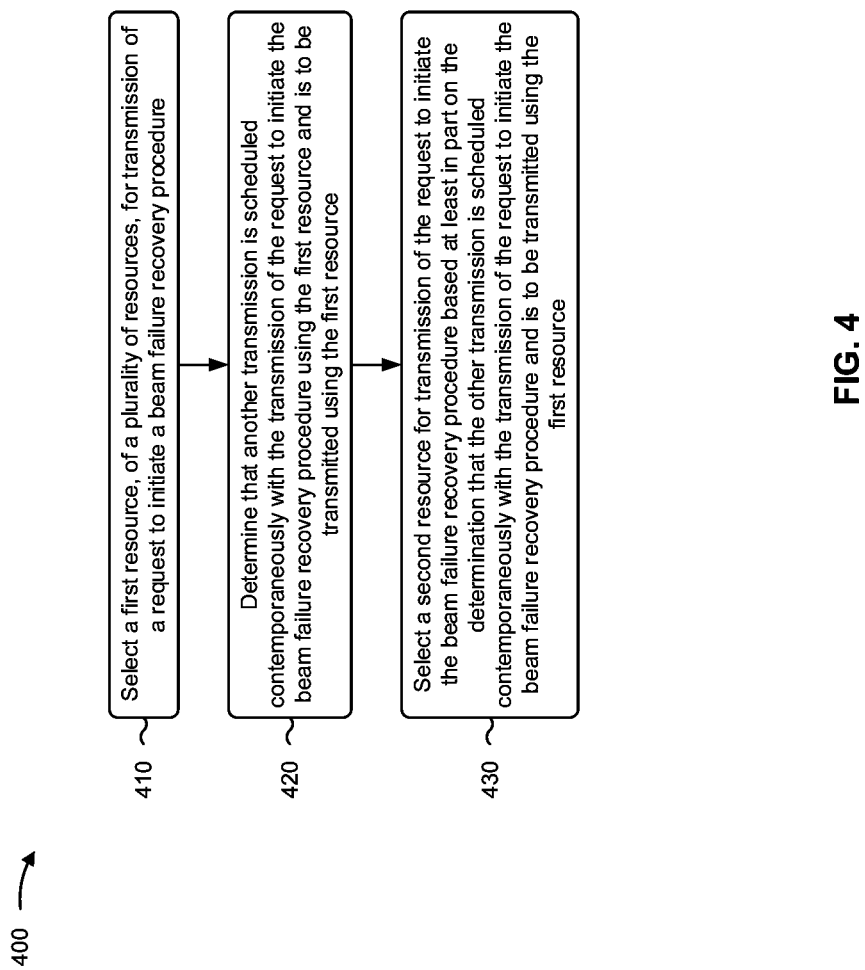
FIG. 4 is a diagram illustrating an example process performed, for example, by a user equipment, in accordance with various aspects of the present disclosure.

FIG. 4 is a diagram illustrating an example process 400 performed, for example, by a user equipment (UE), in accordance with various aspects of the present disclosure. Example process 400 is an example where the UE (e.g., UE 120) performs operations associated with physical uplink control channel beam failure recovery reselection.

As shown in FIG. 4, in some aspects, process 400 may include selecting a first resource, of a plurality of resources, for transmission of a request to initiate a beam failure recovery procedure (block 410). For example, the UE (e.g., using selection component 506, depicted in FIG. 5) may select a first resource, of a plurality of resources, for transmission of a request to initiate a beam failure recovery procedure, as described above.

As further shown in FIG. 4, in some aspects, process 400 may include determining that another transmission is scheduled contemporaneously with the transmission of the request to initiate the beam failure recovery procedure using the first resource and is to be transmitted using the first resource (block 420). For example, the UE (e.g., using determination component 508, depicted in FIG. 5) may determine that another transmission is scheduled contemporaneously with the transmission of the request to initiate the beam failure recovery procedure using the first resource and is to be transmitted using the first resource, as described above.

As further shown in FIG. 4, in some aspects, process 400 may include selecting a second resource for transmission of the request to initiate the beam failure recovery procedure based at least in part on the determination that the other transmission is scheduled contemporaneously with the transmission of the request to initiate the beam failure recovery procedure and is to be transmitted using the first resource (block 430). For example, the UE (e.g., using selection component 506, depicted in FIG. 5) may select a second resource for transmission of the request to initiate the beam failure recovery procedure based at least in part on the determination that the other transmission is scheduled contemporaneously with the transmission of the request to initiate the beam failure recovery procedure and is to be transmitted using the first resource, as described above.

Process 400 may include additional aspects, such as any single aspect or any combination of aspects described below and/or in connection with one or more other processes described elsewhere herein.

In a first aspect, process 400 includes transmitting the request to initiate the beam failure recovery procedure using the second resource.

In a second aspect, alone or in combination with the first aspect, process 400 includes detecting a beam failure, and wherein selecting the first resource comprises selecting the first resource based at least in part on the detection of the beam failure.

In a third aspect, alone or in combination with one or more of the first and second aspects, the first resource is at least one of a physical uplink control channel beam failure recovery request resource or a scheduling request resource.

In a fourth aspect, alone or in combination with one or more of the first through third aspects, the second resource is at least one of physical uplink control channel beam failure recovery request resource or a scheduling request resource.

In a fifth aspect, alone or in combination with one or more of the first through fourth aspects, the determination that another transmission is scheduled contemporaneously with the transmission of the request to initiate the beam failure recovery procedure using the first resource and is to be transmitted using the first resource comprises determining that a hybrid automatic repeat request acknowledgement message with a physical uplink control channel format 1 is to be prioritized for the first resource over the transmission of the request to initiate the beam failure recovery procedure over the first resource, wherein the first resource is a scheduling request with a physical uplink control channel format 0.

In a sixth aspect, alone or in combination with one or more of the first through fifth aspects, the determination that another transmission is scheduled contemporaneously with the transmission of the request to initiate the beam failure recovery procedure using the first resource and is to be transmitted using the first resource comprises determining that a first uplink transmission is to be prioritized for the first resource over the transmission of the request to initiate the beam failure recovery procedure, wherein the first resource is a second uplink transmission with a lower transmission priority than the first uplink transmission.

In a seventh aspect, alone or in combination with one or more of the first through sixth aspects, the selection of the first resource comprises selecting a first physical uplink control channel beam failure recovery resource based at least in part on a network characteristic, and wherein the selection of the second resource comprises selecting to a second physical uplink control channel beam failure recovery resource based at least in part on the determination to drop the first physical uplink control channel beam failure recovery resource.

In an eighth aspect, alone or in combination with one or more of the first through seventh aspects, process 400 includes determining to drop the second physical uplink control channel beam failure recovery resource, selecting to a scheduling request resource based at least in part on the determination to drop the second physical uplink control channel beam failure recovery resource, and requesting an uplink grant using the scheduling request resource based at least in part on the reselection to the scheduling request resource.

In a ninth aspect, alone or in combination with one or more of the first through eighth aspects, the selection of the first resource comprises selecting a first physical uplink control channel beam failure recovery resource in a same physical uplink control channel group as a failed secondary cell associated with the beam failure recovery procedure, and wherein the selection of the second resource comprises selecting a second physical uplink control channel beam failure recovery resource.

In a tenth aspect, alone or in combination with one or more of the first through ninth aspects, the second physical uplink control channel beam failure recovery resource in the same physical uplink control channel group as the failed secondary cell.

In an eleventh aspect, alone or in combination with one or more of the first through tenth aspects, the second physical uplink control channel beam failure recovery resource is in a different physical uplink control channel group than the physical uplink control channel group of the failed secondary cell.

In a twelfth aspect, alone or in combination with one or more of the first through eleventh aspects, process 400 includes determining to drop the second physical uplink control channel beam failure recovery resource, selecting to a scheduling request resource based at least in part on the determination to drop the second physical uplink control channel beam failure recovery resource, and requesting an uplink grant using the scheduling request resource based at least in part on the reselection to the scheduling request resource.

In a thirteenth aspect, alone or in combination with one or more of the first through twelfth aspects, the scheduling request resource is at least one of a scheduling request resource that is available to the UE, a scheduling request resource that is available to the UE in the same physical uplink control channel group as the failed secondary cell, or a scheduling request resource that occurs sequentially first in time.

In a fourteenth aspect, alone or in combination with one or more of the first through thirteenth aspects, the selection of the first resource comprises selecting a physical uplink control channel beam failure recovery resource, and wherein the selection of the second resource comprises selecting a scheduling request resource to request an uplink grant.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
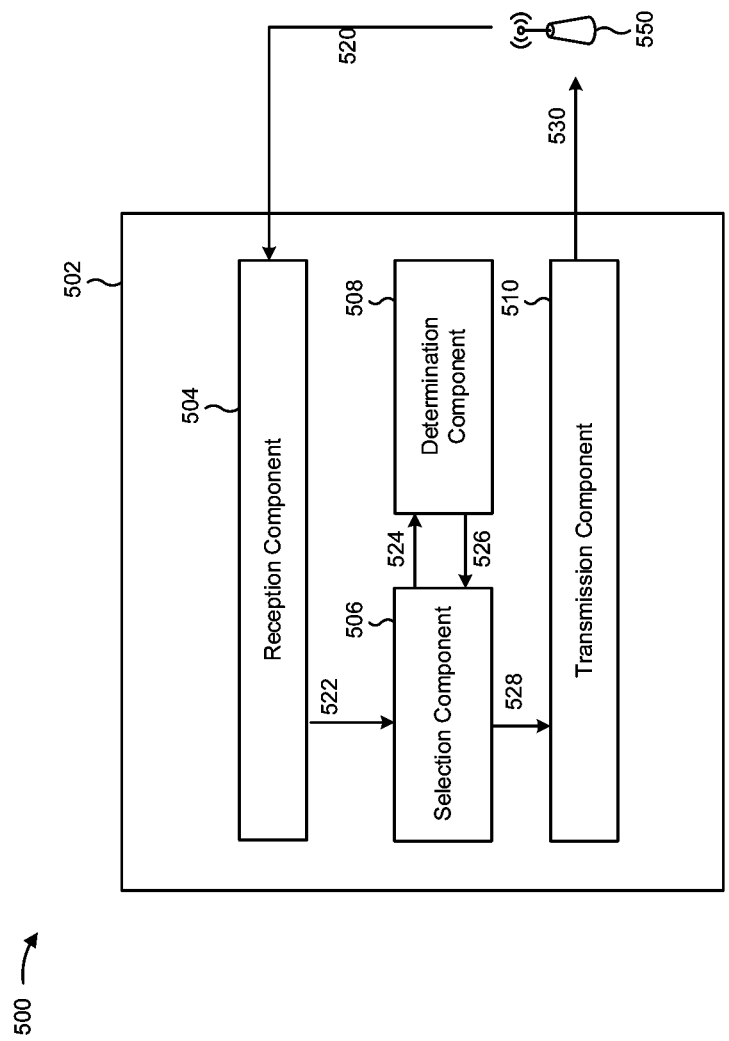
FIG. 5 is a conceptual data flow diagram illustrating data flow between different modules/means/components in an example apparatus, in accordance with various aspects of the present disclosure.

FIG. 5 is a conceptual data flow diagram 500 illustrating a data flow between different modules/means/components in an example apparatus 502. The apparatus 502 may be a UE (e.g., UE 120). In some aspects, the apparatus 502 includes a reception component 504, a selection component 506, a determination component 508, and/or a transmission component 510.

Reception component 504 may receive, from a BS 550, and as data 520, information associated with detecting a beam failure event. For example, the reception component 504 may determine that a beam failure has occurred on a beam for communication with the BS 550 based at least in part on performing a measurement of the beam.

Selection component 506 may receive, from the reception component 504, and as data 522, information associated with selecting a first resource on which to transmit a request to initiate a beam failure recovery procedure. For example, the selection component 506 may receive an indication of a beam failure, an indication of a network characteristic associated with one or more beams (e.g., to enable a selection of a resource on a beam to use to transmit a request to initiate a beam failure recovery procedure), and/or the like. In this case, the selection component 506 may select a first resource with which to transmit a request to initiate a beam failure recovery procedure, as described above.

Determination component 508 may receive, from the selection component 506, and as data 524, information associated with determining whether to use a selected resource for transmission of a request to initiate a beam failure recovery procedure. As described above, the determination component 508 may determine to drop the transmission of the request on the first resource, and may provide data 526 to the selection component 506 to cause the selection component 506 to reselect to a second resource. In this case, the selection component 506 may reselect to a second resource and cause the transmission component 510 to use the second resource or another resource (e.g., a third resource, after a further reselection).

Transmission component 510 may receive, from the selection component 506, and as data 528, information identifying a resource on which to transmit a request to initiate a beam failure recovery procedure, a request for an uplink grant, and/or the like. In this case, the transmission component 510 may transmit data 530 to the BS 550, to cause the BS 550 to initiate the beam failure recovery procedure or provide the uplink grant.

The apparatus 502 may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   selecting a first physical uplink control channel (PUCCH) resource, of a plurality of resources, for a first transmission of a request to initiate a beam failure recovery procedure;
   determining that a second transmission is scheduled to be transmitted using the first PUCCH resource contemporaneously with the first transmission of the request to initiate the beam failure recovery procedure,
      wherein the second transmission is a hybrid automatic repeat request acknowledgement message with a PUCCH format 1 that is to be prioritized for the first PUCCH resource over the first transmission of the request to initiate the beam failure recovery procedure;
   selecting a second PUCCH resource for the first transmission of the request to initiate the beam failure recovery procedure based at least in part on the second transmission being scheduled to be transmitted using the first PUCCH resource contemporaneously with the first transmission of the request to initiate the beam failure recovery procedure and based at least in part on the hybrid automatic repeat request acknowledgement message with the PUCCH format 1 being prioritized for the first PUCCH resource over the first transmission of the request to initiate the beam failure recovery procedure;
   determining that the first transmission of the request to initiate the beam failure recovery procedure on the second PUCCH resource is to be dropped;
   selecting a scheduling request (SR) resource based at least in part on the determination that the first transmission of the request to initiate the beam failure recovery procedure on the second PUCCH resource is to be dropped; and
   transmitting a request for an uplink grant on the SR resource to enable initiation of a beam failure recovery resource.

2. The method of claim 1, further comprising:
   detecting a beam failure; and
   wherein selecting the first PUCCH resource comprises:
      selecting the first PUCCH resource based at least in part on the detection of the beam failure.

3. The method of claim 1, wherein the first PUCCH resource is at least one of a PUCCH beam failure recovery request resource or another SR resource.

4. The method of claim 1, wherein the second PUCCH resource is at least one of PUCCH beam failure recovery request resource or another SR resource.

5. The method of claim 1, wherein the first PUCCH resource is a scheduling request resource with a PUCCH format 0.

6. The method of claim 1, wherein selecting the first PUCCH resource comprises:
   selecting a first PUCCH beam failure recovery resource based at least in part on a network characteristic; and
   wherein selecting the second PUCCH resource comprises:
      selecting a second PUCCH beam failure recovery resource based at least in part on a determination to drop the first PUCCH beam failure recovery resource.

7. The method of claim 6, further comprising:
   determining to drop the second PUCCH beam failure recovery resource; and
   wherein selecting the SR resource comprises:
      selecting the SR resource based at least in part on the determination to drop the second PUCCH beam failure recovery resource.

8. The method of claim 1, wherein selecting the first PUCCH resource comprises:
   selecting a first PUCCH beam failure recovery resource in a same PUCCH group as a failed secondary cell associated with the beam failure recovery procedure; and
   wherein selecting the second PUCCH resource comprises:
      selecting a second PUCCH beam failure recovery resource.

9. The method of claim 8, wherein the second PUCCH beam failure recovery resource is in the same PUCCH group as the failed secondary cell.

10. The method of claim 8, wherein the second PUCCH beam failure recovery resource is in a different PUCCH group than the PUCCH group of the failed secondary cell.

11. The method of claim 8, further comprising:
    determining to drop the second PUCCH beam failure recovery resource; and
    wherein selecting the SR resource comprises:
       selecting the SR resource based at least in part on the determination to drop the second PUCCH beam failure recovery resource.

12. The method of claim 11, wherein the SR resource is at least one of:
   a SR resource that is available to the UE,
   a SR resource that is available to the UE in the same PUCCH group as the failed secondary cell, or
   a SR resource that occurs sequentially first in time.

13. The method of claim 1, wherein selecting the first PUCCH resource comprises:
   selecting a PUCCH beam failure recovery resource; and
   wherein selecting the second PUCCH resource comprises:
      selecting another SR resource to request an uplink grant.

14. A user equipment (UE) for wireless communication, comprising:
   one or more memories; and
   one or more processors coupled to the one or more memories, the one or more processors configured to:
      select a first physical uplink control channel (PUCCH) resource, of a plurality of resources, for a first transmission of a request to initiate a beam failure recovery procedure;
   determine that a second transmission is scheduled to be transmitted using the first PUCCH resource contemporaneously with the first transmission of the request to initiate the beam failure recovery procedure,
      wherein the second transmission is a hybrid automatic repeat request acknowledgement message with a PUCCH format 1 that is to be prioritized for the first PUCCH resource over the first transmission of the request to initiate the beam failure recovery procedure;
   select a second PUCCH resource for the first transmission of the request to initiate the beam failure recovery procedure based at least in part on the second transmission being scheduled to be transmitted using the first PUCCH resource contemporaneously with the first transmission of the request to initiate the beam failure recovery procedure and based at least in part on the hybrid automatic repeat request acknowledgement message with the PUCCH format 1 being prioritized for the first PUCCH resource over the first transmission of the request to initiate the beam failure recovery procedure;
   determine that the first transmission of the request to initiate the beam failure recovery procedure on the second PUCCH resource is to be dropped;
   select a scheduling request (SR) resource based at least in part on the determination that the first transmission of the request to initiate the beam failure recovery procedure on the second PUCCH resource is to be dropped; and
   transmit a request for an uplink grant on the SR resource to enable initiation of a beam failure recovery resource.

15. The UE of claim 14, wherein the one or more processors are further configured to:
   detect a beam failure; and
   wherein the one or more processors, when selecting the first PUCCH resource, are configured to:
      select the first PUCCH resource based at least in part on the detection of the beam failure.

16. The UE of claim 14, wherein the first PUCCH resource is at least one of a PUCCH beam failure recovery request resource or another SR resource.

17. The UE of claim 14, wherein the second PUCCH resource is at least one of PUCCH beam failure recovery request resource or another SR resource.

18. The UE of claim 14, wherein the first PUCCH resource is a scheduling request resource with a PUCCH format 0.

19. The UE of claim 14, wherein the one or more processors, when selecting the first PUCCH resource, are configured to:
   select a first PUCCH beam failure recovery resource based at least in part on a network characteristic; and
   wherein the one or more processors, when selecting the second PUCCH resource, are configured to:
      select a second PUCCH beam failure recovery resource based at least in part on a determination to drop the first PUCCH failure recovery resource.

20. The UE of claim 19, wherein the one or more processors are further configured to:
   determine to drop the second PUCCH beam failure recovery resource; and
   wherein the one or more processors, when selecting the SR resource, are configured to:
      select the SR resource based at least in part on the determination to drop the second PUCCH beam failure recovery resource.

21. The UE of claim 14, wherein the one or more processors, when selecting the first PUCCH resource, are configured to:
   select a first PUCCH beam failure recovery resource in a same PUCCH group as a failed secondary cell associated with the beam failure recovery procedure; and
   wherein the one or more processors, when selecting the second PUCCH resource, are configured to:
      select a second PUCCH beam failure recovery resource.

22. The UE of claim 21, wherein the second PUCCH beam failure recovery resource is in the same PUCCH group as the failed secondary cell.

23. The UE of claim 21, wherein the second PUCCH failure recovery resource is in a different PUCCH group than the PUCCH group of the failed secondary cell.

24. The UE of claim 21, wherein the one or more processors are further configured to:
   determine to drop the second PUCCH beam failure recovery resource; and
   wherein the one or more processors, when selecting the SR resource, are configured to:
      select the SR resource based at least in part on the determination to drop the second PUCCH beam failure recovery resource.

25. The UE of claim 24, wherein the SR resource is at least one of:
   a SR resource that is available to the UE,
   a SR resource that is available to the UE in the same PUCCH group as the failed secondary cell, or
   a SR resource that occurs sequentially first in time.

26. The UE of claim 14, wherein the one or more processors, when selecting the first PUCCH resource, are configured to:
   select a PUCCH beam failure recovery resource; and
   wherein the one or more processors, when selecting the second PUCCH resource, are configured to:
      select a scheduling request resource to request an uplink grant.

27. A non-transitory computer-readable medium storing a set of instructions for wireless communication, the set of instructions comprising:
   one or more instructions that, when executed by one or more processors of a user equipment (UE), cause the UE to:

select a first physical uplink control channel (PUCCH) resource, of a plurality of resources, for a first transmission of a request to initiate a beam failure recovery procedure;

determine that a second transmission is scheduled to be transmitted using the first PUCCH resource contemporaneously with the first transmission of the request to initiate the beam failure recovery procedure,
   wherein the second transmission is a hybrid automatic repeat request acknowledgement message with a PUCCH format 1 that is to be prioritized for the first PUCCH resource over the first transmission of the request to initiate the beam failure recovery procedure;

select a second PUCCH resource for the first transmission of the request to initiate the beam failure recovery procedure based at least in part on the second transmission being scheduled to be transmitted using the first PUCCH resource contemporaneously with the first transmission of the request to initiate the beam failure recovery procedure and based at least in part on the hybrid automatic repeat request acknowledgement message with the PUCCH format 1 being prioritized for the first PUCCH resource over the first transmission of the request to initiate the beam failure recovery procedure;

determine that the first transmission of the request to initiate the beam failure recovery procedure on the second PUCCH resource is to be dropped;

select a scheduling request (SR) resource based at least in part on the determination that the first transmission of the request to initiate the beam failure recovery procedure on the second PUCCH resource is to be dropped; and transmit a request for an uplink grant on the SR resource to enable initiation of a beam failure recovery resource.

28. The non-transitory computer-readable medium of claim 27, wherein the one or more instructions further cause the UE to:
   detect a beam failure; and
   wherein the one or more instructions, that cause the UE to select the first PUCCH resource, cause the UE to:
      select the first PUCCH resource based at least in part on the detection of the beam failure.

29. The non-transitory computer-readable medium of claim 27, wherein the one or more instructions, that cause the UE to select the first PUCCH resource, cause the UE to:
   select a first PUCCH beam failure recovery resource based at least in part on a network characteristic; and
   wherein the one or more instructions, that cause the UE to select the second PUCCH resource, cause the UE to:
      select a second PUCCH beam failure recovery resource based at least in part on a determination to drop the first PUCCH failure recovery resource.

30. An apparatus for wireless communication, comprising:
   means for selecting a first physical uplink control channel (PUCCH) resource, of a plurality of resources, for a first transmission of a request to initiate a beam failure recovery procedure;
   means for determining that a second transmission is scheduled to be transmitted using the first PUCCH resource contemporaneously with the first transmission of the request to initiate the beam failure recovery procedure,
      wherein the second transmission is a hybrid automatic repeat request acknowledgement message with a PUCCH format 1 that is to be prioritized for the first PUCCH resource over the first transmission of the request to initiate the beam failure recovery procedure;
   means for selecting a second PUCCH resource for the first transmission of the request to initiate the beam failure recovery procedure based at least in part on the second transmission being scheduled to be transmitted using the first PUCCH resource contemporaneously with the first transmission of the request to initiate the beam failure recovery procedure and based at least in part on the hybrid automatic repeat request acknowledgement message with the PUCCH format 1 being prioritized for the first PUCCH resource over the first transmission of the request to initiate the beam failure recovery procedure,
   means for determining that the first transmission of the request to initiate the beam failure recovery procedure on the second PUCCH resource is to be dropped;
   means for selecting a scheduling request (SR) resource based at least in part on the determination that the first transmission of the request to initiate the beam failure recovery procedure on the second PUCCH resource is to be dropped; and
   means for transmitting a request for an uplink grant on the SR resource to enable initiation of a beam failure recovery resource.

\* \* \* \* \*